March 8, 1938.  B. S. AIKMAN  2,110,692
RETARDATION CONTROLLER
Filed May 15, 1936
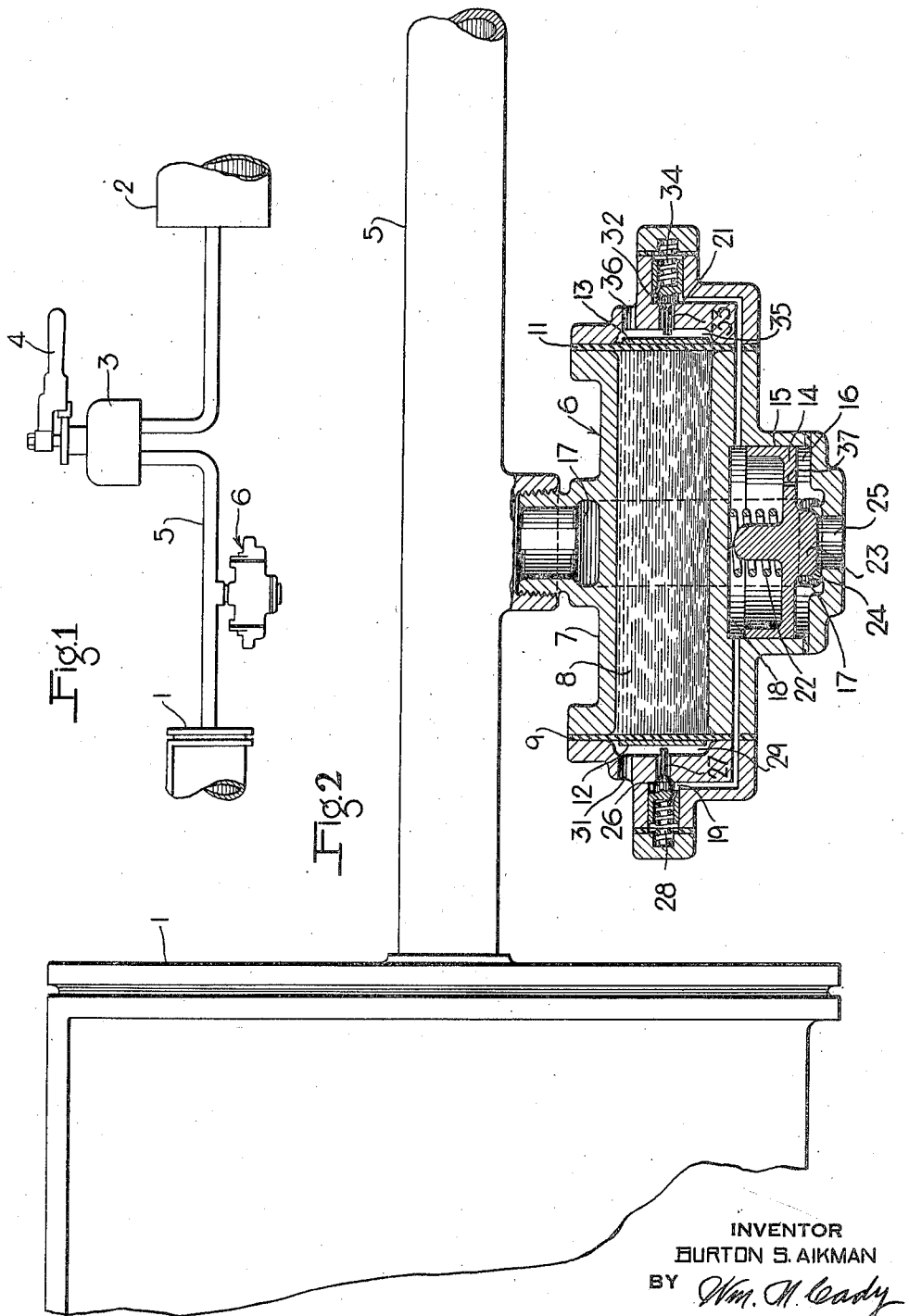
INVENTOR
BURTON S. AIKMAN
BY Wm. M. Cady
ATTORNEY Patented Mar. 8, 1938

2,110,692

UNITED STATES PATENT OFFICE 2,110,692

RETARDATION CONTROLLER

Burton S. Aikman, Wilkinsburg, Pa., assignor to The Westinghouse Air Brake Company, Wilmerding, Pa., a corporation of Pennsylvania Application May 15, 1936, Serial No. 79,939

10 Claims. (Cl. 303—24)

My invention relates to retardation controllers for vehicles, and particularly to retardation controllers for limiting the braking force of fluid pressure brakes in accordance with the rate of retardation of the vehicle.

In vehicles employing friction type brakes it is well known that for a given braking pressure such brakes are less effective in retarding the motion of the vehicle at high speeds than at low speeds because of the varying coefficient of friction between the wheels and the brake shoe which is lower at high speed than at low speed.

In order to bring a vehicle to a stop quickly, employing the maximum permissible brake pressure at all speeds, it has been usual practice for the operator to apply the brakes with a high degree of braking pressure at high speeds, and, as the speed of the vehicle lessens, to decrease the braking pressure gradually in order to provide for a smooth stop without shock or slipping of the wheels.

It is an object of my invention to provide a reliable and inexpensive retardation controller device for application to fluid pressure brake equipment.

It is another object of my invention to provide a retardation controller device that is operable in either direction of vehicle travel, and that is not subject to adjustments by the operator.

It is a further object of my invention to provide a retardation controller device that may be directly applied to each brake cylinder pipe of the equipment.

Other objects and advantages of my invention will be apparent from the following description of one preferred embodiment of my invention, reference being had to the accompanying drawing, in which Fig. 1 is a diagrammatic view of a brake equipment employing my invention, and Fig. 2 is an enlarged view of a portion thereof, parts being shown in section.

Referring to the drawing, a fluid pressure brake is provided having a brake cylinder 1 that may be supplied with fluid under pressure from a main reservoir 2 in accordance with the operation of a brake valve device 3 having a manually operable handle 4 as supplied through a brake cylinder pipe 5 to which my retardation controller device 6 is applied.

It will be understood that Fig. 1 is schematic only and that fluid under pressure may be supplied to the brake cylinder by means of any well known equipment such as straight air equipment or automatic equipment, the supply of fluid under pressure being controlled either by a relay valve device, or an automatic valve device, in the manner well known in these types of brake equipment.

The retardation controller device 6 is shown attached to and directly supported by the brake cylinder pipe 5, preferably adjacent to the brake cylinder 1, and comprises a casing 7 containing a chamber 8 that is substantially filled with a heavy mobile liquid, such as mercury. The front and rear walls 9 and 11, respectively, of the chamber 8 are movable abutments, such as diaphragms, and are provided with follower plates 12 and 13, respectively. The diaphragms 9 and 11 constitute the front and rear walls of the chamber 8, with respect to the direction of travel of the vehicle, so that, when the brakes are applied, a pressure caused by the inertia of the mobile fluid within the chamber 8 is exerted directly against either the abutment 9 or the abutment 11, depending upon the direction of motion of the vehicle.

A valve piston 14 is positioned within a bore 15 in the lower part of the casing, providing a valve chamber 16 on one side thereof that is in constant open communication with the brake cylinder 1 through passage 17 and brake cylinder pipe 5, and a chamber 18 on the other side thereof that is in constant open communication with pilot valve chambers 19 and 21. The piston 14 is normally urged downwardly by a spring 22 contained within the chamber 18, causing a valve 23 thereon to engage a valve seat 24 and close communication between the valve chamber 16 and the atmosphere through exhaust port 25.

A pilot valve 26 is provided within the pilot valve chamber 19 having a stem 27 extending through a bore in a wall of the casing and adapted to be engaged by the follower plate 12 associated with the diaphragm 9. A spring 28 is provided, one end of which is positioned within a recess provided in the casing and the other end of which is positioned within a recess in the pilot valve 26, for forcing the pilot valve to its seat to close communication from the pilot valve chamber 19 to the atmosphere through chamber 29 and exhaust port 31.

A pilot valve 32 is provided within the pilot valve chamber 21 having a stem 33 extending through a bore in the casing and adapted to be engaged by the following plate 13 associated with the diaphragm 11. A spring 34 is provided having one end positioned in a recess in the casing structure and the other end positioned in a recess in the pilot valve 32 for forcing the valve to its seat to close communication between the pilot valve chamber 21 and the atmosphere through the chamber 35 and the exhaust port 36.

The operation of the equipment is as follows:

When the operator wishes to apply the brakes the handle 4 of the brake valve device 3 is moved to a brake applying position to effect the supply of fluid under pressure from the reservoir 2 to the brake cylinder 1, to a desired degree, and is then moved to lap position, in the well known manner. As fluid under pressure fills up in the brake cylinder pipe 5 and the brake cylinder 1, it also builds up in the passage 17 and the chamber 16 below the valve piston 14. The spring 22, within the chamber 18, is so adjusted as to hold the piston 14 downwardly causing the valve 23 to remain against its seat 24 until a predetermined differential in pressures between the chambers 16 and 18 exists. As the fluid pressure builds up in the brake cylinder 1 and in the chamber 16 at the usual rate of application of the brakes, fluid under pressure also flows from the chamber 16 through a restricted port 37 in the piston 14 to the chamber 18 to equalize the pressures on the opposite sides of the piston 14. This flow of fluid under pressure from the chamber 16 to the chamber 18 takes place at a sufficiently rapid rate to prevent the differential necessary to unseat the valve 23 from developing, so that the valve 23 is held seated by the spring 22.

It will be appreciated that the device is so mounted that the bore of the chamber 8 extends longitudinally of the vehicle so that the end abutments 9 and 11 constitute the front and rear walls of the chamber 8 with respect to the direction of vehicle travel and are subject to the force of inertia caused by the movement of the mobile body within the chamber 8 upon the retardation of the vehicle.

If the vehicle is moving toward the left as viewed in the drawing the mobile body within the chamber 8 will tend to move toward the left against the abutment 9 as the rate of retardation of the vehicle increases. When the rate of retardation reaches a predetermined value the follower plate 12, associated with the diaphragm abutment 9, will engage the stem 27 of the pilot valve 26, and, upon a sufficient further increase in the rate of retardation of the vehicle to overcome the force of the spring 28, will force the pilot valve 26 from its seat against the bias of the spring 28 to open communication from the chamber 18 above the valve piston 14 to the atmosphere through the pilot valve chamber 19, chamber 29 and exhaust port 21, thus rapidly decreasing the pressure within the chamber 18. Upon this decrease in the pressure on the upper side of the piston 14, the pressure within the chamber 16, on the underside of the valve piston 14, will raise the valve piston upwardly, unseating the valve 23 and permitting the release of fluid under pressure from the brake cylinder 1, and brake cylinder pipe 5, through passage 17, chamber 16, and exhaust port 25 to the atmosphere, to reduce brake cylinder pressure and thus reduce the rate of retardation of the vehicle.

As the rate of retardation of the vehicle is thus reduced, the force of inertia upon the mobile body within the chamber 8 is correspondingly decreased, thus reducing the force exerted by the follower plate 12 on the valve stem 27, and permitting the valve 26 to be seated by the spring 28 to close communication between the chamber 18 and the atmosphere, and to permit the pressure within the chamber 18 to build up by further flow of fluid under pressure from the chamber 16 through the port 37 in the valve piston 14. The valve 23 is thus forced to its seat by the combined pressure of the spring 22 and the increasing fluid pressure within the chamber 18 on the upper side of the piston 14, acting against the fluid pressure within the chamber 16, thus preventing the further decrease in fluid pressure within the brake cylinder 1.

As the vehicle speed decreases, and the rate of retardation of the vehicle increases, due to the increasing coefficient of friction between the moving parts at lower vehicle speeds, the force of the mobile body within the chamber 8 will again become sufficient to cause the follower plate 12 to act against the stem 27 with sufficient force to unseat the pilot valve 26 and repeat the above described operation of the valve piston 24 to permit the further flow of fluid under pressure from the brake cylinder 1 to the atmosphere. This operation of the relay valve piston 14 may reoccur frequently during the deceleration of the vehicle until the pressure within the brake cylinder and within the chamber 16 has been reduced to a value such that the force of the spring 22 on the valve piston 14 will hold the valve 23 seated when the pressure in the chamber 18 has been reduced to atmospheric pressure. The minimum permissible brake cylinder pressure is thus provided by the adjustment of a spring 22.

If, when the brakes are applied, the vehicle is moving toward the right, as viewed in the drawing, the force of the mobile body within the chamber 8 will be effective against the abutment 11 to force the follower plate 13 against the valve stem 33 and unseat the pilot valve 32 to vent the chamber 18 and cause operation of the relay pilot valve piston 14 in the same manner as described above.

It will be apparent from the above description that I have provided a reliable and inexpensive retardation controller for application to the brake cylinder pipe of fluid pressure brake equipments that is operable in either direction of vehicle travel and that is not subject to adjustment by the operator during operation of the vehicle.

Many modifications in the arrangement of parts will be apparent to one skilled in the art without departing from the spirit of my invention and I do not wish to be limited otherwise than by the scope of the appended claims.

Having now described my invention, what I claim as new and desire to secure by Letters Patent, is:

1. In a brake equipment for vehicles, in combination, a brake cylinder, means including a brake cylinder pipe for supplying fluid under pressure to said brake cylinder to apply the brakes, a retardation controller device adapted to be mounted on said brake cylinder pipe adjacent said brake cylinder, a relay valve comprising a piston normally biased to close communication between said brake cylinder and the atmosphere, and means for controlling the operation of said relay valve to effect communication between said brake cylinder and said atmosphere comprising fluid inertia responsive means responsive to the rate of retardation of the vehicle and pilot valve means subject to a predetermined movement of said inertia means in either direction from a neutral position.

2. In a brake equipment for vehicles, in combination, a brake cylinder, means including a brake cylinder pipe for supplying fluid under pressure to the brake cylinder to apply the brakes, a retardation controlled device adapted to be mounted on a flange constituting an outlet in said brake cylinder pipe adjacent said brake cylinder, a relay valve comprising a piston normally biased to close communication between said brake cylinder and the atmosphere, means for controlling the operation of said relay valve to effect communication between said brake cylinder and the atmosphere comprising means responsive to a desired rate of retardation of the vehicle including a fluid mobile body, an abutment actuated by said mobile body in either direction from a neutral position, and means controlled thereby for effecting the operation of said relay valve means to release fluid under pressure from the brake cylinder.

3. In a brake equipment for vehicles, in combination, a brake cylinder, means for supplying fluid under pressure to the brake cylinder to apply the brakes, a retardation device for limiting the brake cylinder pressure comprising a chamber in constant open communication with the brake cylinder, a relay valve device therein normally closing communication between the brake cylinder and the atmosphere, a chamber substantially filled with a mobile body and having movable abutments forming the front and rear walls thereof, pilot valve means actuated upon movement of said abutments by said mobile body in response to the rate of retardation of the vehicle for operating said relay valve device to release fluid under pressure from said brake cylinder.

4. In a brake equipment for vehicles, in combination, a brake cylinder, means for supplying fluid under pressure to said brake cylinder to apply the brakes, a retardation controller device comprising a spring weighted valve piston normally biased to close communication between said brake cylinder and the atmosphere, and subject on one side to brake cylinder pressure, means for equalizing the fluid pressure on opposite sides of the piston, a chamber substantially filled with a mobile inertia body and having movable abutment walls on the opposite sides thereof aligned in the direction of vehicle travel, means including pilot valves controlled by said movable abutment for unbalancing the pressures on the two sides of said valve piston to operate said valve piston to effect a reduction in brake cylinder pressure.

5. In a brake equipment for vehicles, in combination, a brake cylinder, means for supplying fluid under pressure to said brake cylinder to apply the brakes, a retardation controller device comprising a spring weighted valve piston normally biased to close communication between said brake cylinder and the atmosphere, a chamber substantially filled with a mobile inertia body and having movable abutment walls on the opposite sides thereof in the line of vehicle travel, means controlled by said movable abutments for operating said spring weighted valve piston to effect a reduction in brake cylinder pressure upon movement of said mobile body from the neutral position.

6. In a brake equipment for vehicles, in combination, a brake cylinder, means for supplying fluid under pressure to said brake cylinder to apply the brakes, and fluid inertia means movable in either of two directions in accordance with the retardation of the vehicle, two valve means one of which is actuated by movement of the inertia means in one direction, and the other of which is actuated by movement of said inertia means in the other direction for effecting the release of fluid under pressure from the brake cylinder upon a predetermined rate of retardation of the vehicle.

7. In a brake equipment for vehicles, in combination, a brake cylinder, means for supplying fluid under pressure to said brake cylinder to apply the brakes, a retardation controller device comprising a spring weighted valve piston normally biased to close communication between said brake cylinder and the atmosphere, and subject on one side to brake cylinder pressure, means for equalizing the fluid pressure on opposite sides of the piston, a fluid inertia body movable in either of two directions from a neutral position in accordance with the retardation of the vehicle, and two pilot valves, actuated, respectively, upon movement of said inertia body in the one or the other direction from said neutral position for unbalancing the pressure on the two sides of said valve piston to operate said valve piston to effect a reduction in brake cylinder pressure.

8. A vehicle brake equipment comprising, in combination, a brake cylinder, a pipe through which fluid under pressure is supplied to the brake cylinder to effect application of the brakes, said pipe having a T outlet therein, a casing having a single extension detachably connected to the said pipe at the T outlet, said extension constituting the only means of attachment of the casing to the pipe, said casing also having a chamber constantly subject to the pressure of fluid in said pipe through a passage which extends through said extension, a normally closed valve operative to open said chamber to atmosphere and accordingly release fluid under pressure from said pipe and brake cylinder, and inertia means contained within the casing and responsive to the rate of retardation of the vehicle for controlling operation of the said valve.

9. A vehicle brake equipment comprising, in combination, a brake cylinder effective upon the supply of fluid under pressure thereto to cause application of the brakes, a normally closed exhaust valve operative to release fluid under pressure from the brake cylinder, a casing having a chamber, a body of fluid contained in said chamber, movable abutments located at opposite ends of said chamber in the line of travel of the vehicle and moved by the inertia force of the fluid body exerted thereon upon application of the brakes, and means operated by the movement of said abutments for effecting operation of the said valve to release fluid under pressure from the brake cylinder.

10. A vehicle brake equipment comprising, in combination, a brake cylinder effective upon the supply of fluid under pressure thereto to cause application of the brakes, a normally closed exhaust valve operative to release fluid under pressure from the brake cylinder, a casing having a chamber, a body of fluid contained in said chamber, movable abutments located at opposite ends of said chamber in the line of travel of the vehicle and moved by the inertia force of the fluid body exerted thereon upon application of the brakes, and means operative upon a certain uniform degree of movement of either of said abutments from its normal position for effecting operation of said valve to release fluid under pressure from brake cylinder.

BURTON S. AIKMAN.